INVENTORS
SIDNEY H. LIEBSON
ROBERT W. CLARK
BY Louis A Kline
Richard G. Stahr
THEIR ATTORNEYS INVENTORS
SIDNEY H. LIEBSON
ROBERT W. CLARK
BY
Louis A. Kline
Richard G. Stahr
THEIR ATTORNEYS

INVENTORS
SIDNEY H. LIEBSON
ROBERT W. CLARK

BY [signature]
[signature]
THEIR ATTORNEYS

Feb. 7, 1967 S. H. LIEBSON ETAL 3,303,468
CHARACTER RECOGNITION SYSTEM EMPLOYING A SENSING DEVICE
WITH A PHOTOSENSITIVE SURFACE
Filed March 2, 1964 5 Sheets-Sheet 4

INVENTORS
SIDNEY H. LIEBSON
ROBERT W. CLARK
BY Louis A. Kline
Richard G. Stahr
THEIR ATTORNEYS INVENTORS
SIDNEY H. LIEBSON
ROBERT W. CLARK
BY
Louis A. Kline
Richard G. Stahr
THEIR ATTORNEYS

United States Patent Office 3,303,468

Patented Feb. 7, 1967

3,303,468

CHARACTER RECOGNITION SYSTEM EMPLOYING A SENSING DEVICE WITH A PHOTOSENSITIVE SURFACE

Sidney H. Liebson, Dayton, and Robert W. Clark, Centerville, Ohio, assignors to The National Cash Register Company, Dayton, Ohio, a corporation of Maryland Filed Mar. 2, 1964, Ser. No. 348,371
8 Claims. (Cl. 340—146.3)

The present invention relates to optical character identification systems and, more particularly, to an optical character identification system utilizing a photosensitive surface as the sensing medium.

Recently, there has been an increasing tendency to apply automation to the gathering of data and the compilation of this data into statistical form. To increase the efficiency of the computing equipment which is involved with these applications, it is often desirable to optically read the pertinent characters and supply the gathered intelligence as an input to the data-processing systems employed.

In this regard, there are numerous arrangements which have been developed for the purpose of optically identifying characters. Included in the variety of systems thus far evolved are systems in which the characters are photoelectrically scanned along definite horizontal and/or vertical lines for determining the black-white transitions; systems in which the black and white areas within selected fields are determined and analyzed; systems in which scanning schemes determine the contour of the characters; and other systems, in which stylized fonts are necessary.

While all of these identification systems have merit, they also have many disadvantages. Usually, quite bulky equipment is required to process the information which is required for the identification of characters, and many of these systems are very sensitive to irregularities in characters in regard to print quality and skew. Stylized font readers, in particular, are disadvantageous in that they are ineffective for use with characters not printed in the specific font to which systems of this type are adapted.

Because modern business requires increased speeds in the compilation and dissemination of data in a variety of applications, the necessity for a rapid and reliable optical character identification system is apparent.

It is, therefore, an object of this invention to provide an improved optical character identification system.

It is another object of this invention to provide an improved optical character identification system utilizing a photosensitive surface as the sensing medium.

In accordance with this invention, a character identification system is provided wherein the characters to be identified are imaged upon a photosensitive surface and within a sensing area defined by the location thereupon of a plurality of selectively-positioned electrical contact pairs wherein the electrical potential across respective contact pairs is measured while the character is imaged thereupon to establish a potential pattern which is impressed upon an electronic logic system which is designed to evaluate these patterns and to produce an output signal representative of the character imaged thereupon.

For a better understanding of the present invention, together with additional objects, advantages, and features thereof, reference is made to the following description and accompanying drawings, in which.

Figure 3:
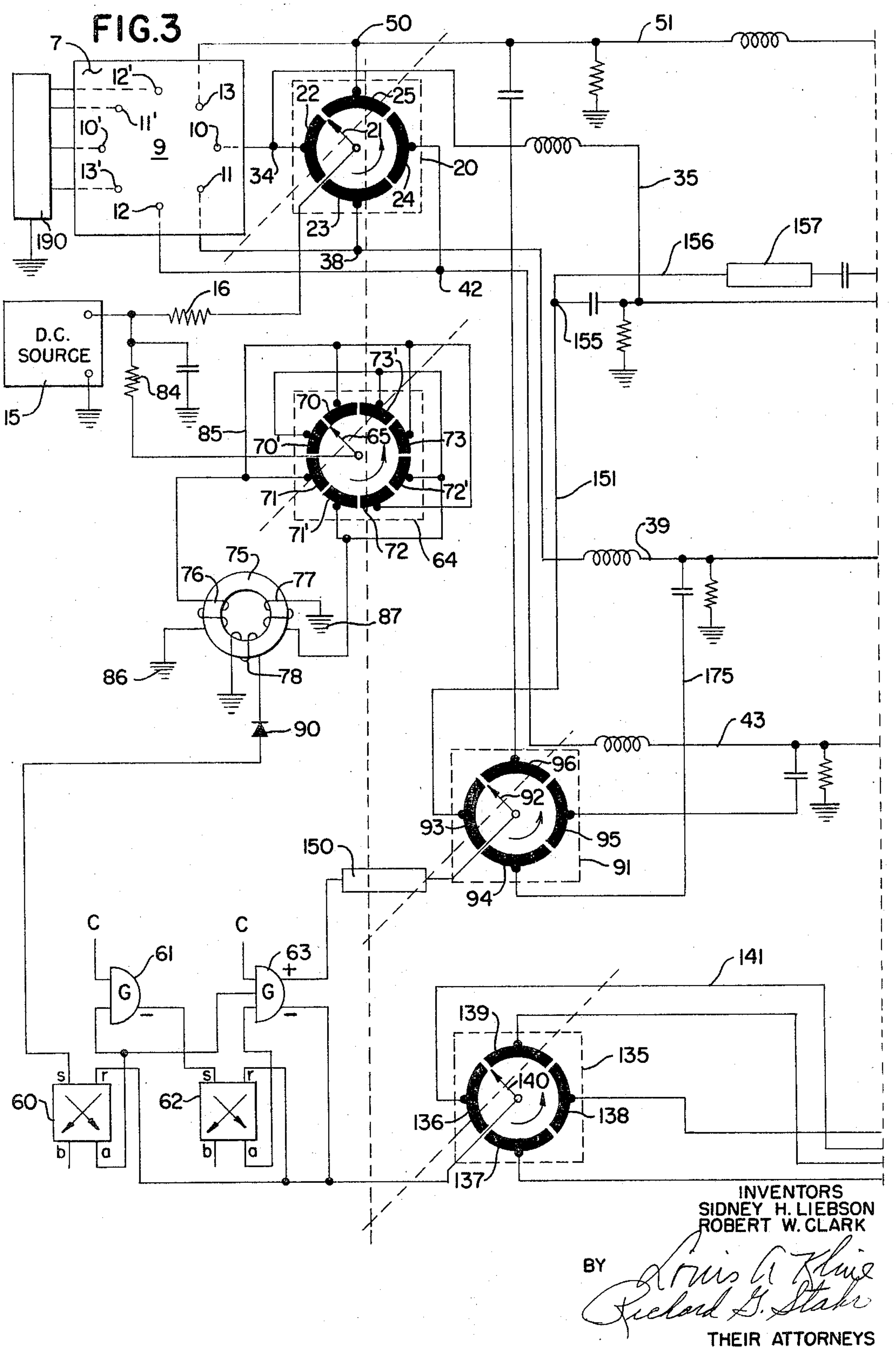
Figure 4:
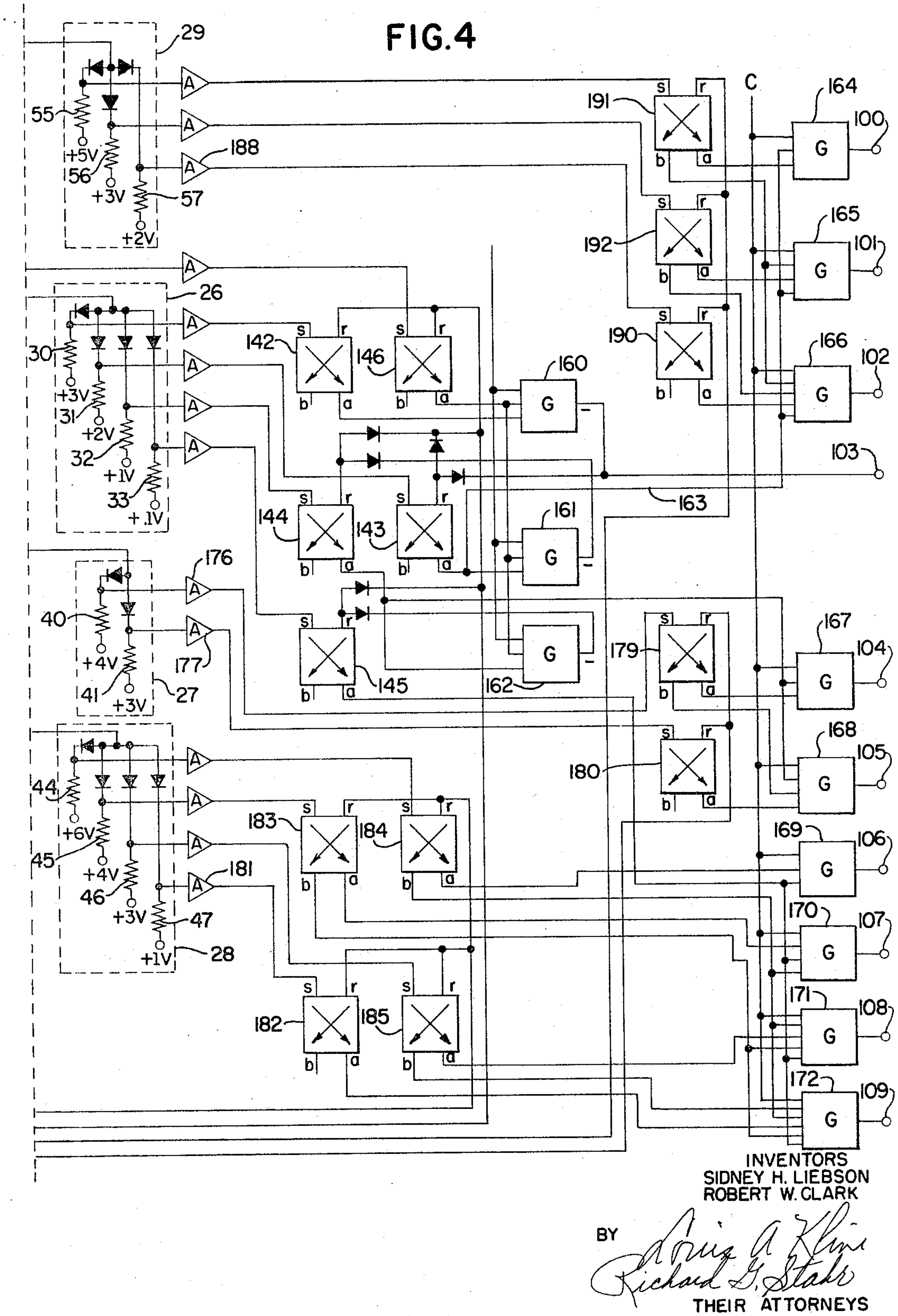
Figure 5:
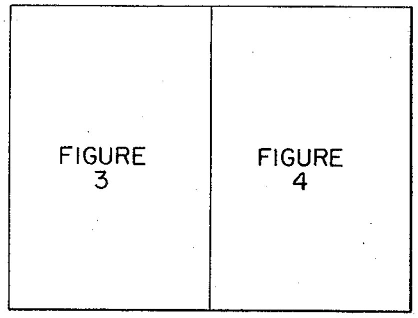

FIGURES 3 and 4, when arranged as shown in FIGURE 5, form a schematic diagram of the sensing and evaluating logic circuitry of this invention.

FIGURE 5 indicates the arrangement of FIGURES 3 and 4.

Figure 6:
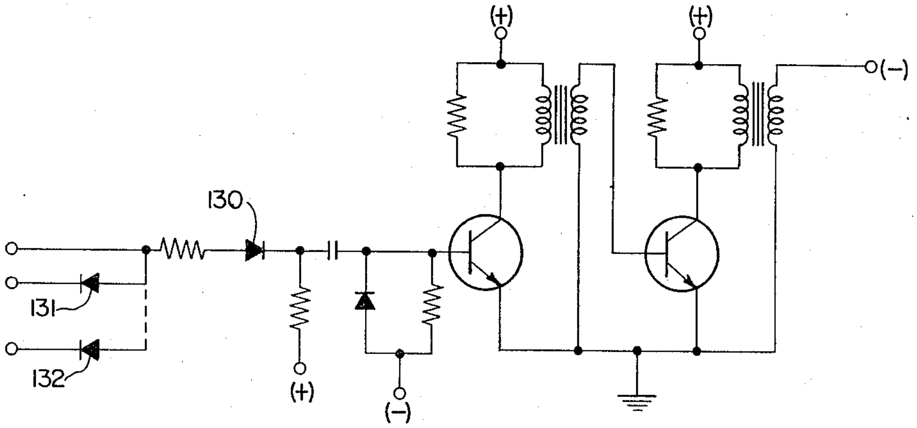

FIGURE 6 is a schematic diagram of a conventional, multiple input AND gate.

Figure 6A:
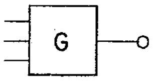

FIGURE 6*a* is the schematic representation of the device of FIGURE 6 as used throughout FIGURE 4.

Figure 7:
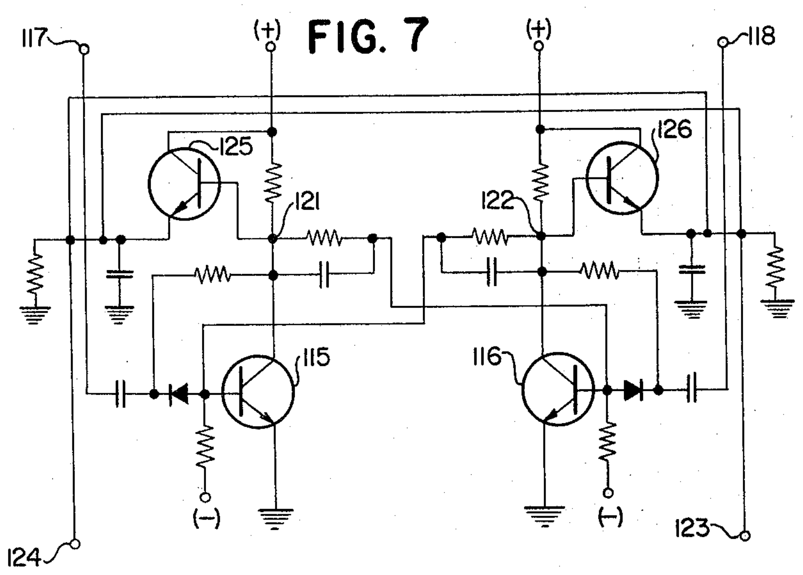

FIGURE 7 is a schematic diagram of a conventional bistable multivibrator device.

Figure 7A:
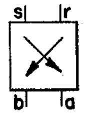

FIGURE 7*a* is the schematic representation of the device of FIGURE 6, which is used throughout FIGURES 3 and 4.

Figures 8, 8A:
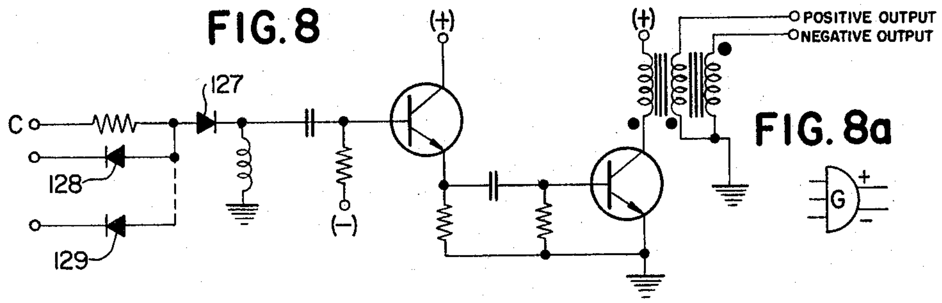

FIGURE 8 is a schematic diagram of a conventional multiple input AND gate with a positive and negative polarity output.

FIGURE 8*a* is the schematic representation of the device of FIGURE 7 as used in FIGURE 3.

Figure 9:
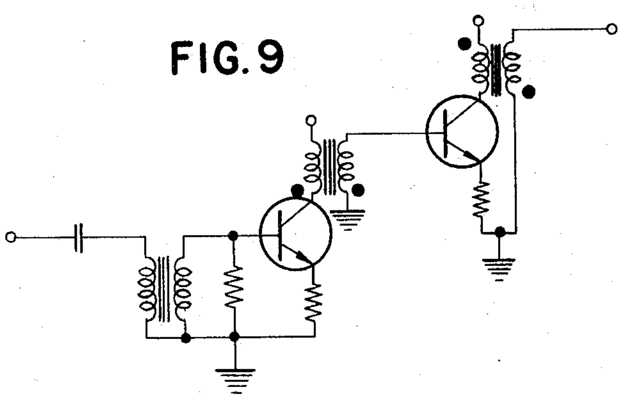

FIGURE 9 is a schematic diagram of a conventional pulse amplifier.

Figure 9A:
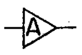

FIGURE 9*a* is the schematic representation of the device of FIGURE 9 as used in FIGURE 4.

For purposes of illustrating the features of this invention, the decimal digit two (2) will be assumed to be projected upon the photosensitive sensing surface, and the operation of this novel system for identifying this character and producing a representative output signal therefor will be described.

Figure 1:
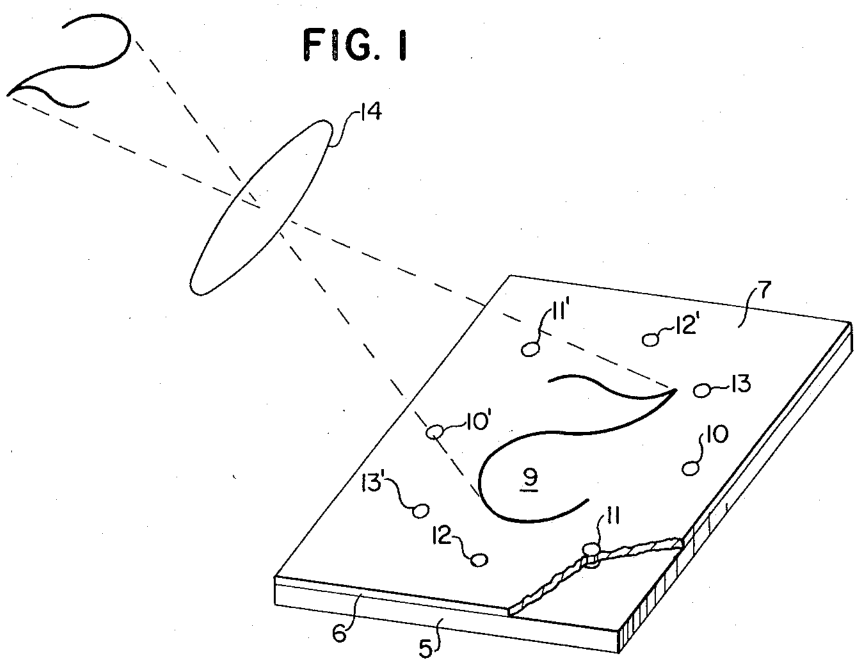
FIGURE 1 is a schematic representation of the sensing device of this invention with a character to be identified imaged within the sensing area thereupon.

Referring to FIGURE 1 of the drawings, there is schematically shown the sensing device of this invention. Upon one surface of a substrate member 5 of any suitable dielectric or insulating material, such as glass-impregnated epoxy resin or a similar material, there is deposited a thin film 6 of a photosensitive material of the type which is characterized by a change in electrical conductivity, such as selenium, cuprous oxide, lead sulphide, or similar photosensitive materials, when illuminated. The surface area 7 of this thin film of photosensitive material 6 is the photosensitive surface which functions as the sensing medium of this invention. A plurality of spaced electrical contact pairs, 10–10′, 11–11′, 12–12′, and 13–13′, are selectively positioned to define a sensing area 9 upon and are electrically connected to the photosensitive surface 7. That is, the area which would be enclosed within an imaginary circle drawn through all of these electrical contacts is the sensing area upon the photosensitive surface. The character to be identified must be imaged upon the photosensitive surface 7 within this area.

The thin film 6 of photosensitive material may be deposited upon one surface of the substrate member 5 by any one of the several conventional deposition methods well known. As these methods are well known in the art and form no part of this invention, they will not be described herein. It is to be understood that the thickness of the film 6 on the substrate member 5 of FIGURE 1 is exaggerated for illustrative purposes, as this film is actually in the order of 10 microns thick.

In a practical application of this device, the photosensitive material, hereinafter referred to as the sensing material, deposited as a thin film on the substrate member was of the photoconductive type. That is, the electrical conductivity of this sensing material increased when the material was illuminated. However, the operation of the system of this invention is dependent upon a change in electrical conductivity of this sensing material when illuminated; therefore, materials possessing opposite electrical conductivity characteristics when illuminated may also be used as the sensing material. Although the following description of the system of this invention will be on the basis of a photoconductive sensing material, it is to be specifically understood that sensing materials having the opposite electrical characteristics when illuminated may also be used without departing from the spirit of this invention.

The electrical contact pairs 10–10′, 11–11′, 12–12′, and 13–13′ are shown to be in a circular configuration in FIGURE 1. This configuration is illustrative only and is not to be construed as a limitation, as other arrangements of these contact pairs are possible without departing from the spirit of the invention.

The electrical conductivity of a path between pairs of points upon a photoconductive surface is a function of the geometrical distribution and the amount of light falling upon the photoconductive surface between the points. That is, the photoconductive surface paths between pairs of points may be thought of as resistive paths, the resistance of which is altered by the degree of illumination falling thereupon. For example, if the numerical digit one (1) be projected upon a photoconductive surface as a dark image on a light background, the electrical conductivity of the resistive path between two points which is normal to the major axis of the image will be much greater than the electrical conductivity of the resistive path between two points which is parallel to and covered by the image.

Because the image of every numerical digit is geometrically different from the image of every other, the image of each numerical digit projected upon the photoconductive surface within a plurality of points thereon will produce a pattern of electrical conductivities which is different from the pattern produced by every other.

The degree of electrical conductivity of the paths between the respective pairs of points on a photoconductive surface may be expressed in terms of potential drop measured thereacross, as these paths may be thought of as being electrically resistive. This may be done in the usual manner by connecting a source of direct current potential across the series combination of a fixed resistor and the path under consideration, and measuring the potential across the path.

To obtain the several potential patterns, each of which is unique to only one character, for purposes of this specification numerical digits, the characters to be identified are projected as a dark image on a light background upon the photoconductive surface of the sensing device of this invention and within the sensing area thereon as defined by the plurality of electrical contact pairs. While the character is imaged upon the sensing device and using the same direct current potential source and fixed series resistor, the potential drop across each contact pair is measured.

Figure 2:
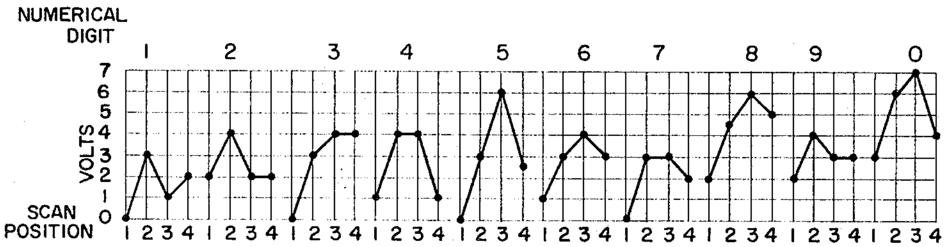
FIGURE 2 is a graphic representation of typical potential patterns developed across four electrical contact pairs with each of the ten numerical digits imaged upon the sensing surface.

In the interest of convenience, each of the electrical contact pairs will hereinafter be referred to as positions in which the potential is determined. That is, the contact pairs 10–10′, 11–11′, 12–12′, and 13–13′ will be referred to as positions 1, 2, 3, and 4, respectively. In FIGURE 2 is graphically shown the unique potential pattern for each of the numerical digits. These patterns were obtained by measuring the potential drop across the path between corresponding contact pairs in positions 1, 2, 3, and 4 as each character was imaged within the sensing area 9 of the practical sensing device illustrated in FIGURE 1. It may be noted in FIGURE 2 that, although the measured potential drop for some of the positions is identical for several different characters, there are no two characters which produce the same potential drop in all of the positions. While ten unique potential patterns were obtained with only four positions or contact pairs, it is to be specifically understood that more or fewer contact pairs may be used without departing from the spirit of the invention.

This information having been obtained, evaluating logic circuitry may be designed to distinguish between these several different potential patterns and produce an output signal representative of the character producing the pattern.

FIGURES 3 and 4, when arranged as shown in FIGURE 5, schematically illustrate the sensing and evaluating logic circuitry of this invention. To avoid confusion in the drawing, the character to be identified has not been shown to be imaged within the sensing area 9 of the sensing device schematically illustrated in FIGURE 3. However, the decimal digit 2 is shown to be imaged through a schematically represented optical system 14 upon the photoconductive surface 7 within the sensing area 9 in FIGURE 1.

To supply power, a conventional direct current power supply 15 may be used. As this power supply may be of conventional design well known in the art and forms no part of this invention, it is herein shown in block form.

In the operation of the device of this invention, the potential of the source 15 is successively applied, through a fixed series resistor 16, across the resistive paths upon the photoconductive surface 7 between each of the four electrical contact pairs, while the character to be identified is imaged within the sensing area 9. For successively applying the potential of the source 15 across the several electrical contact pairs during successive scan periods, a sense scanning device is employed. This sense scanning device may be a conventional rotary-type switch, schematically shown in FIGURE 3 at reference numeral 20, having a movable contact 21 and four stationary contacts 22, 23, 24, and 25. Assuming that the movable contact 21 is driven by an electric motor, not shown, in a counterclockwise direction, it is apparent that this contact will successively establish an electrical connection with each of the stationary contacts 22, 23, 24, and 25 during one revolution. The grounding device 190 is constructed to supply a ground potential to one contact of a contact pair simultaneously with the application of a positive potential to the other contact of the contact pair through the switch 20. In the interest of convenience, the position of the movable contact 21 to establish electrical connection with each of the stationary contacts will be referred to as scan positions 1, 2, 3, and 4, corresponding to the respective contact pairs 10–10′, 11–11′, 12–12′, and 13–13′, and the duration of time that contact is established with each of the stationary contacts will be referred to as scan periods 1, 2, 3, and 4. For purposes of illustrating the principles of this invention, a conventional rotary-type mechanical switch has been shown as the sense scanning device; however, it is t obe specifically understood that other suitable sense scanning devices may be employed without departing from the spirit of the invention.

Referring to FIGURE 3, it is apparent that the sense scanning device 20 applies the source of direct current potential 15 across each of the contact pairs 10–10′, 11–11′, 12–12′, and 13–13′ during successive scan periods. That is, the potential of the source 15 is applied, through the fixed resistor 16 and the movable contact 21, successively across the electrical contact pairs 10–10′, through the stationary contact 22 in scan position 1 during scan period 1, 11–11′ through the stationary contact 23 in scan position 2 during scan period 2, 12–12′ through stationary contact 24 in scan position 3 during scan period 3, and 13–13′ through the stationary contact 25 in scan position 4 during scan period 4.

Corresponding to each of the electrical contact pairs 10–10′, 11–11′, 12–12′, and 13–13′ is a respective potential-level-sensitive circuit schematically shown within each of the dashed rectangles referenced by numerals 26, 27, 28, and 29 in FIGURE 4, respectively. Each of these circuits includes a plurality of potential-level-sensitive sub-circuits, each of which is composed of a parallel resistor having one end thereof connected to a respective source of constant direct current bias potential and its opposite end connected to a common input terminal through respective series-connected diodes which are poled in such a manner as to be reverse-biased by the corresponding source of constant direct current bias potential. Therefore, to enable any one of those diodes to conduct, a forward bias potential of a magnitude greater than the reverse bias of the corresponding constant potential bias source must be applied to the corresponding input terminal. With this arrangement, each series combination of a diode, the associated resistor, and the associated source of constant direct current bias potential constitutes a potential-level-sensitive sub-circuit which is sensitive to a forward bias potential level of a magnitude equal to or greater than the magnitude of the associated constant source of bias potential but is insensitive to potential levels of a lower magnitude. Therefore, each potential-level-sensitive sub-circuit of each potential-level-sensitive circuit is sensitive to a different potential level.

In the potential-level-sensitive circuit 26, one end of each of parallel resistors 30, 31, 32, and 33 is connected to a separate source of constant positive direct current bias potential of respective magnitudes of three volts, two volts, one volt, and one tenth volt. In the potential-level-sensitive circuit 27, one end of each of parallel resistors 40 and 41 is connected to a separate source of constant positive direct current bias potential of respective magnitudes of four volts and three volts. In the potential-level-sensitive circuit 28, one end of each of parallel resistors 44, 45, 46, and 47 is connected to a separate source of constant positive direct current bias potential of respective magnitudes of six volts, four volts, three volts, and one volt. In the potential-level-sensitive circuit 29, one end of each of parallel resistors 55, 56, and 57 is connected to a separate source of constant positive direct current bias potential of respective magnitudes of five volts, three volts, and two volts. As the several sources of constant direct current bias potential may be conventional sources of regulated direct current potential which form no part of this invention, they have not been shown in FIGURE 4; however, the terminals of the several resistors have been labeled to indicate the potential magnitude to which each is connected.

The other end of all of these resistors in each potential-level-sensitive circuit is returne to the common input terminal of that circuit through respective diodes poled to be reverse-biased by the positive bias potential applied to the opposite end of the associated resistor. To produce conduction through any one of these diodes, a positive polarity potential of a magnitude equal to or greater than the respective bias sources must be applied to the associated potential-level-sensitive circuit input terminal. Therefore, if the potential drop across the resistive path upon the photoconductive surface 7 between any of the contact pairs is arranged to be positive, the application of this positive potential to the input terminal of the corresponding potential-level-sensitive circuit will forward-bias those diodes of the potential-level-sensitive sub-circuits thereof which are reverse-biased by a positive potential of a magnitude equal to or less than the applied potential. A positive potential pulse applied to the input terminal of the potential-level-sensitive circuit and superimposed upon the steady positive potential drop from the resistive path will then be conducted through the enabled diodes and will appear as positive signal pulses across the associated resistor. These signal pulses will be evaluated by the evaluating logic circuitry to be described later.

The potential drop across the resistive paths between each of the contact pairs 10–10′, 11–11′, 12–12′, and 13–13′ appears as a positive potential at each of respective points 34, 38, 42, and 50 during each respective scan period, which is the time during which the movable contact 21 is in contact with each respective stationary contact. Electrically conductive lines 35, 39, 43, and 51, respectively, direct this potential developed across each of the electric contact pairs to the corresponding potential-level-sensitive circuit during each respective scan period. Therefore, during each scan period, the potential developed across the corresponding electric contact pair is applied to the input circuit terminal of the corresponding potential-level-sensitive circuitry. Those potential-level-sensitive sub-circuits thereof which are sensitive to a potential level of a magnitude equal to or less than the magnitude of the applied potential, as determined by the reverse bias potential, are thereby enabled to conduct a positive polarity pulse therethrough during that scan period.

The positive polarity pulses which are conducted through the enabled diodes of the potential-level-sensitive sub-circuits and appear as positive potential signal pulses across the associated resistors are the electrical signals which are evaluated by the evaluating logic circuitry, to be described later. To supply these positive polarity pulses and also to supply timed pulses which may be used to synchronize or "clock" the system, a source of electrical clock pulses may be employed.

Any one of the conventional oscillator circuits which are commonly used with synchronous data-processing systems or similar systems may be used for this application and forms no part of this invention. Therefore, in the interest of reducing drawing complexity, this source is not shown, and the circuitry of FIGURES 3 and 4 which is connected to the clock source is labeled with the letter "C".

During each span period, one pulse from the source of electrical clock pulses is superimposed upon the steady state direct current potential applied to the input circuit terminal of the potential-level-sensitive circuit corresponding to that scan position. Therefore, a synchronizing circuit for establishing an electrical circuit for the conduction therethrough of one positive potential clock pulse during each scan period is provided and is composed of two conventional bistable multivibrator units 60 and 62 and two conventional dual output AND gates 61 and 63. These devices form no part of the invention and, therefore, are schematically represented in FIGURE 3. Detailed circuitry of devices of this type which are satisfactory for this application is schematically set forth in FIGURES 7 and 8, respectively. The description of the operation of this synchronizing circuit and of the bistable multivibrator and gate devices will be presented in detail later in this specification.

As the synchronizing circuit must conduct therethrough one clock pulse during each scan period and is not self-starting, a synchronizing-circuit-initiating circuit is provided. This circuit includes a conventional mechanical type of rotary switch, schematically shown within the dashed rectangle 64, having a movable contact 65 and four pairs of stationary contacts 70–70′, 71–71′, 72–72′, and 73–73′, one pair for each scan position, and a conventional core 75, of magnetic material possessing substantially square hysteresis loop characteristics, having a "set" winding 76, a "reset" winding 77, poled in a sense opposite that of the "set" winding 76, and an output winding 78. The movable contact 65 is arranged to revolve in the same direction as and synchronously with the movable contact 21 of the sense scanning device 20, previously described. As the movable contact 21 of the sense scanning device 20 establishes contact with the stationary contact 22 at the beginning of the scan period for scan position 1, the movable contact 65 of the switch 64 establishes contact with its stationary contact 70. This connection establishes an electrical circuit from the source of potential 15, through a resistor 84, the movable contact 65, the stationary contact 70, a line 85, and the "set" winding 76 to a point of reference potential 86. The resulting flow of current through the winding 76 "sets" the core 75 into either one of its two stable states of magnetic remanence, as is well known in the magnetic core art. Later during the scan period, the movable contact 65, revolving counter-clockwise, breaks contact with the stationary contact 70 and establishes contact with a stationary contact 70′. This connection establishes an electrical circuit from the source of potential 15, through the resistor 84, the movable contact 65, the stationary contact 70′, and the "reset" winding 77 to a point of reference potential 87. The resulting flow of current through the winding 77, poled in a sense opposite that of the "set" winding 76, switches or "resets" the core 75 into its alternate stable state of magnetic remanence, as is well known in the art. Therefore, during one revolution of the movable contact 65, the core 75 is "set" at the beginning of each scan period upon the establishment of a contact with respective stationary contacts 70, 71, 72, and 73 and is "reset" later during each scan period upon the establishment of contact with respective stationary contacts 70′, 71′, 72′, and 73′. Upon each reversal of the stable state of magnetic remanence of the core 75 as it is "set" and "reset," an electrical pulse, which is of one polarity when the core 75 is "set" and of the opposite polarity when the core 75 is "reset," is induced in the output winding 78. For purposes of this specification, it will be assumed that the polarity of the induced pulse is negative as the core 75 is "set" and positive as it is "reset." As the synchronizing circuitry, to be described later, has been selected to be sensitive to negative polarity pulses, the negative polarity pulses produced upon the "set" of the core 75 initiates the synchronizing circuitry, and the diode 90 is so poled. It is to be understood that the terms "set" and "reset" as applied to the changes of state of magnetic remanence of bistable magnetic devices made of material having substantially square hysteresis characteristics are arbitrary and that other terms may be used for these changes of condition without departing from the spirit of the invention.

In a manner to be described later, the synchronizing circuit is arranged to conduct therethrough one positive polarity clock pulse during each scan period. To direct this clock pulse to the input circuit terminal of the potential-level-sensitive circuit corresponding to the scan position being scanned during that period, another conventional mechanical rotary-type switch, schematically illustrated within the dashed rectangle 91, having a movable contact 92 and four stationary contacts 93, 94, 95, and 96, may be employed. The movable contact 92 is arranged to revolve in the same direction as and synchronously with the movable contacts 21 and 65 of the devices 20 and 64, respectively.

Corresponding to each character is an output circuit terminal upon which appears an electrical signal upon the identification of the corresponding character. In FIGURE 4, the output terminal 100 corresponds to the numerical digit 8, the output terminal 101 corresponds to the numerical digit 9, the output terminal 102 corresponds to the numerical digit 2, the output terminal 103 corresponds to zero, the output terminal 104 corresponds to the numerical digit 4, the output terminal 105 corresponds to the numerical digit 6, the output terminal 106 corresponds to the numerical digit 5, the output terminal 107 corresponds to the numerical digit 3, the output terminal 108 corresponds to the numerical digit 7, and the output terminal 109 corresponds to the numerical digit 1.

Included between the several output circuit terminals and the potential-level-sensitive circuits in FIGURE 4 is the evaluating logic circuitry, upon which are impressed the positive signal pulses appearing across the resistors of the potential-level-sensitive sub-circuits of the several potential-level-sensitive circuits for evaluation and the production of an output signal upon the output circuit terminal corresponding to the character identified. As may be seen, this evaluating logic circuitry is made up of a combination of conventional bistable multivibrator units and conventional AND gate devices, the detailed schematic diagrams of which are set forth in FIGURES 7 and 6, respectively. The operation of this evaluating logic circuitry to produce the signal upon the output terminal corresponding to the character identified will be discussed in detail later in this specification.

Referring to FIGURE 7, the schematic circuitry of the bistable multivibrator unit suitable for use with the system of this invention is set forth. This circuit has two type NPN transistor devices 115 and 116 with their bases cross-connected. As is well known in the bistable multivibrator art, with either transistor 115 or 116 conducting, the other transistor is not conducting. With the transistor 115 conducting and the transistor 116 not conducting, this device is in one of its stable states of operation, and, with the transistor 116 conducting and the transistor 115 not conducting, this device is in its opposite stable state of operation. To reverse the stable state of operation or to trigger this device to its opposite stable state, the conducting transistor may be biased off by applying the proper polarity electric signal to the input circuit terminal which is connected to the base electrode of that transistor. As both transistors 115 and 116 of the schematic circuitry herein set forth are indicated to be type NPN transistors, the base electrode must be biased with an electrical potential more positive the the emitter electrode thereof to permit conduction therethrough, assuming that the collector-emitter electrodes are correctly biased relative to each other. Therefore, to extinguish or bias "off" a conducting type NPN transistor, it is necessary that a negative potential signal be applied to the base electrode. Assuming that the transistor 115 is conducting, a negative polarity signal applied to the input terminal 117 will extinguish or bias this transistor "off" and trigger the device to its alternate stable state, and, assuming that the transistor 116 is conducting, a negative polarity signal applied to the input terminal 118 will extinguish or bias this transistor "off," thereby triggering the device to its alternate stable state. Although the output of this device may be taken from the collectors of the transistors 115 and 116 at the points 121 and 122, respectively, to provide a better impedance match, a conventional emitter-follower circuit is inserted between these points and the corresponding output terminals 123 and 124. That is, an emitter-follower transistor 125 is inserted between the point 121 and the corresponding output terminal 123, and an emitter-follower transistor 126 is inserted between the point 122 and the corresponding output terminal 124.

With the transistor 115 conducting, the potential at the point 121 and the base electrode of the emitter-follower transistor 125 is substantially ground; therefore, the emitter-follower transistor 125 is not conducting. With the emiter-follower transistor 125 not conducting, the potential at the output terminal 123 is substantially ground. With the transistor 115 not conducting, the potential at the point 121 and the base electrode of the emitter-follower transistor 125 is of a positive polarity, and the transistor 125 is conducting. With the transistor 125 conducting, the potential of the output terminal 123 is of a positive polarity.

With the transistor 116 conducting, the potential at the point 122 and the base electrode of the emitter-follower transistor 126 is substantially ground, and the transistor 126 is not conducting. With the transistor 126 not conducting, the potential of the output terminal 124 is substantially ground. With the transistor 116 not conducting, the potential at the point 122 and the base electrode of the emitter-follower transistor 126 is positive, and the transistor 126 is conducting. With the transistor 126 conducting, the potential at the output terminal 124 is positive. Therefore, the potential appearing at each of the output terminals 123 and 124 of this device may be alternated between ground potential and a positive potential. As ground potential is more negative than a positive potential, therefore, a ground potential appearing at either of these output circuit terminals may be considered negative.

For purposes of this specification, and without intention or inference of a limitation thereto, it will be assumed that, with the transistor 115 conducting, the bistable multivibrator device schematically set forth in FIGURE 7 is in the first stable state, with the polarity of the output terminals 123 and 124 being negative and positive, respectively, and that, with the transistor 116 conducting, the bistable multivibrator device is in the second stable state, with the polarity of the output terminals 123 and 124 being positive and negative, respectively. To trigger this device to the first stable state, a negative polarity electrical signal must be applied to the input terminal 118, and, to trigger this device to the second stable state, a negative polarity electrical signal must be applied to the input terminal 117. In the interest of convenience, the first and second stable states of operation of these devices will hereinafter be referred to as the "reset" and "set" conditions of operation, and the input terminals corresponding to the input terminals 118 and 117 will hereinafter be referred to as the "reset" and the "set" terminals, respectively. That is, a negative polarity signal applied to the "reset" terminal will trigger the device to the "reset" condition, and a negative polarity signal applied to the "set" terminal will trigger the device to the "set" condition.

As there are many devices of this type employed in the evaluating logic circuitry of the system of this invention, each will be schematically represented in FIGURES 3 and 4 as is shown in FIGURE 7*a*. So that this schematic representation will be consistent throughout the drawings, the "set" input terminal corresponding to the terminal 117 of FIGURE 7 will be labeled *s*; the "reset" terminal corresponding to the input terminal 118 of FIGURE 7 will be labeled *r*; the output terminal corresponding to the output terminal 123 of FIGURE 7 will be labeled *a*; and the output terminal corresponding to the output terminal 124 of FIGURE 7 will be labeled *b*, as is shown in FIGURE 7*a*.

Schematically set forth in FIGURE 6 is a conventional multiple input type AND gate which may be used in the evaluating logic circuitry of the system of this invention as set forth in FIGURE 4, and in FIGURE 8 is schematically set forth a conventional multiple input-dual polarity output type AND gate which may be used in the synchronizing circuitry as set forth in FIGURE 3. The schematic circuit of FIGURE 8 indicates this device to have two transistor stages of amplification, and a three winding output transformer. It may be noted that the secondary windings of the output transformer are poled relative to the primary winding in such a manner as to produce a positive polarity output signal on one output terminal and a negative polarity output signal on a second output terminal. The positive polarity clock pulses are impressed upon the input terminals labeled C of each of these devices which includes respective diodes 130 and 127 poled in a manner to conduct positive polarity pulses therethrough to the base electrode of the first transistor of the initial stage of amplification. Connected in a shunt relationship with the input circuits C may be one or more other respective input circuits, each of which includes a diode poled in a manner as indicated by the diodes 128 and 129 in FIGURE 8, and 131 and 132 in FIGURE 6. With this circuitry, a negative polarity signal present upon any input circuit except the clock input circuit will forward bias the associated diode and will provide a shunt path for the positive polarity clock pulses; hence there will be no output signal. Positive potential signals appearing at all of the input circuits, except the clock input circuit, however, reverse bias the respective diodes, rendering them not conducting. Under these conditions, the positive polarity clock signal pulse is conducted through the diodes 127 or 130 to the base electrode of the transistor of the first stage amplifier. As there are many devices of this type used with the synchronizing circuitry and the evaluating logic circuitry of FIGURES 3 and 4, each device has been schematically illustrated in these figures by the schematic representations shown in FIGURES 6*a* and 7*a*.

To assure that all of the bistable multivibrator devices of the evaluating logic circuitry associated with each scan position are placed in the proper condition of operation at the beginning of each scan period, a "reset" arrangement may be provided. This may take the form of another conventional mechanical-type rotary switch similar to that used for the devices 20, 64, and 91 and is schematically indicated within the dashed rectangle 135 of FIGURE 3. This switch may have four stationary contacts 136, 137, 138, and 139, corresponding to respective scan positions 1, 2, 3, and 4, and a movable contact 140, which is arranged to revolve in the same direction as, and synchronously with, the movable contacts of the devices 20, 64, and 91.

The devices 20, 64, 91, and 135 may be a conventional four-gang rotary switch having a common shaft, to which is connected each of the rotary contacts, driven by an electric motor (not shown). Switches of this type are well known in the art and form no part of this invention. However, it is to be specifically understood that alternate arrangements for providing this same mechanical function electrically, mechanically, or electronically may be employed without departing from the spirit of the invention.

It may be noted that each resistor of each potential-level-sensitive sub-circuit of the several potential-level-sensitive circuits of FIGURE 4 are shown to be connected through a triangle to the associated bistable multivibrator device. These triangles are schematic representations of conventional pulse amplifiers of a type well known in the art and forming no part of this invention. A pulse amplifier of this type which is satisfactory for use in this application is schematically set forth in FIGURE 9, and the schematic representation thereof, as used in FIGURES 3 and 4, is set forth in FIGURE 9*a*.

For purposes of describing the operation of the system of this invention, it will be assumed that the numerical digit 2 is imaged upon the photosensitive surface 7 within the sensing area 9 of FIGURE 3 in a manner schematically illustrated in FIGURE 1.

With the numerical digit 2 imaged upon the sensing area 9, the movable contacts 21, 65, 92, and 140 of the devices 20, 64, 91, and 135, respectively, are synchronously revolved counter-clockwise. At the beginning of scan period 1, the movable contact 21 of the sense scanning device contacts its stationary contact 22, thereby establishing an electrical circuit, previously described, for applying the potential of the source 15 across the electrical contact pairs 10–10′ upon the photosensitive surface 7 during scan period 1. The potential drop across the resistive path upon the photosensitive surface 7 between the contact pairs 10–10′ appears as a positive polarity potential at the point 34, from which it is directed through the line 35 to the common input terminal of the corresponding potential-level-sensitive circuit 26. As the movable contact 21 of the sense scanning device 20 maintains contact with its stationary contact 22 during the entire first scanning period, this potential is maintained upon the common input terminal of the potential-level-sensitive circuit 26 during the entire first scan period.

Referring to FIGURE 2, it may be noted that in scan position 1, with the decimal digit 2 imaged upon the photoconductive sensing surface 7, the potential drop across the resistive path on the photoconductive surface between the corresponding contact pairs 10–10′ is positive two volts. As the diodes corresponding to the resistors 31, 32, and 33 of the potential-level-sensitive sub-circuits of the potential-level-sensitive circuit 26 are reverse biased by fixed positive bias potentials of magnitudes of two volts, one volt, and one tenth volt, respectively, these diodes are biased to conduct the first positive clock pulse which is superimposed upon the steady state potential applied to the common input terminal.

Assuming that the core 75 of the synchronizing circuit initiating circuit is in the "reset" condition, as the movable contact 65 of the device 64 of the synchronizing initiating circuitry contacts its stationary contact 70, the core 75 is placed in its "set" condition by the flow of current from the source 15 through a circuit previously described. This change of state of magnetic remanence of the core 75 induces a negative polarity electrical pulse in its output winding 78, which is conducted through the diode 90 and applied to the "set" input terminal of the bistable multivibrator 60 of the synchronizing circuitry. Later during the first scan period, the movable contact 65 contacts the stationary contact 70′ and establishes an electrical circuit, previously described, for the flow of current from the source 15 through the "reset" winding 77, thereby switching the core 75 to its "reset" state of magnetic remanence. The positive polarity pulse thus produced is not passed by the diode 90.

The negative polarity pulse hereinabove described triggers the multivibrator 60 to its "set" condition of operation, and the polarity of the signal at its output terminal "*a*" is positive. This positive polarity signal is applied to one of the input circuits of each of the gates 61 and 63. As a positive polarity signal is applied to one of the two input terminals of the gate 61, the next positive polarity clock pulse appearing upon its terminal C is conducted therethrough. The negative signal appearing upon its negative output terminal is applied as a "set" pulse to the "set" input terminal of the bistable device 62, thereby triggering this device to its "set" condition of operation. With the device 62 in the "set" condition of operation, the signal appearing at its output terminal *a* is of a positive polarity and is applied to the third of the input terminals of the gate 63. As two of the three input terminals of the gate 63 now have positive polarity signals applied thereto, the next positive polarity clock pulse appearing on the clock terminal C is conducted therethrough.

The negative polarity signal now appearing upon the negative output terminal of the gate 63 is employed for two purposes. It is applied to the "reset" terminals of each of the bistable devices 60 and 62, thereby triggering both these devices to their "reset" condition, which disenables this synchronizing circuitry before the next clock pulse. Therefore, only one clock pulse is transmitted therethrough during this scan period. In this manner, then, the synchronizing circuitry permits the passage therethrough of only one electrical clock pulse during each scan period. The negative polarity signal appearing upon the negative output terminal of the gate 63 is also applied to the movable contact 140 of the reset switch 135, which, during the scan period of scan position 1, is contacting its stationary contact 136. Therefore this negative polarity signal is directed through the movable contact 140, the stationary contact 136, and the line 141 to the "reset" terminals of each of bistable devices 142, 143, 144, 145, and 146, all of which are associated with the potential-level-sensitive circuit 26 which corresponds to scan position 1 and contact pairs 10–10′. This assures that these devices are in their "reset" condition before the positive polarity potential clock pulse appearing at the positive potential output circuit terminal of the gate 63 is applied to the input circuit terminal of the potential-level-sensitive circuit 26, as this pulse is slightly delayed to permit this resetting operation, in a manner to be next described.

To direct the positive potential electrical clock pulse appearing at the output terminal of the gate 63 of the synchronizing circuit to the common input terminal of the potential-level-sensitive circuit 26 corresponding to the electrical contact pairs 10–10′, the movable contact 92 of the switch 91 contacts the stationary contact 93 thereof at the beginning of scan period 1. The positive potential clock pulse appearing at the positive potential output terminal of the gate 63 is conducted through a delay line 150, which delays this pulse for a period of time long enough to have the bistable devices 142, 143, 144, 145, and 146 triggered to their "reset" condition, as previously described, through the movable contact 92, the stationary contact 93, and the line 151 to the common input terminal of the potential-level-sensitive circuit 26.

As the diodes associated with the resistors 31, 32, and 33 of the potential-level-sensitive sub-circuits of the potential-level-sensitive circuit 26 are forward biased by the steady state potential appearing at the point 34, as previously described, the electrical clock pulse appearing on the line 151 is conducted therethrough and appears as positive potential pulses across the respective resistors 31, 32, and 33. These positive polarity pulses are amplified by the associated pulse amplifiers and their polarity reversed by the output transformer secondary winding of each of these amplifiers, as shown in FIGURE 9. The now negative polarity pulses are applied to the "set" input terminals of each of the bistable devices 143, 144, and 145, thereby triggering these devices to their "set" condition of operation.

It may be noted that the line 151 of FIGURE 3 is branched at the point 155; therefore, a portion of this positive potential clock pulse appearing on the line 151 is diverted to the line 156. This portion of the positive polarity electrical clock pulse is conducted through a conventional delay line 157, of a type well known in the art, which forms no part of this invention, where this portion of the pulse is delayed a sufficient period of time to allow the bistable devices 143, 144, and 145 to be "set" by the positive polarity pulses appearing across the respective resistors 31, 32, and 33 of the potential-level-sensitive circuit 26. After passing through the delay line 157, this signal is amplified in the associated amplifier, its polarity is changed to negative by the output transformer, and is applied as a "set" pulse to the "set" input terminal of the bistable device 146, thereby triggering this device to its "set" condition of operation.

As the bistable device 146 is now in its "set" condition of operation, the polarity of the potential at its output circuit terminal *a* is positive and is applied at one of the input circuit terminals of each of the gates 160, 161, and 162. As the bistable devices 143, 144, and 145 have previously been triggered to their "set" condition of operation, the polarity of the potential appearing at the output terminals *a* of each of them is positive. This positive potential at the *a* output terminal of the device 143 is applied to one input terminal of the gate 161, the positive potential appearing at the *a* output terminal of the device 144 is applied to one of the input terminals of the gate 162, and the positive potential appearing at the *a* output terminal of the device 145 is applied to one of the input terminals of the gate 169. Therefore, two of the three input terminals of the gates 161 and 162 have positive potential signals applied thereto, and only one of the input terminals of the gate 160 has a positive potential signal applied thereto, as the bistable device 142 has not been triggered to its "set" condition. Therefore, with the appearance of the next positive potential clock pulse upon clock line C, this pulse is conducted through the gates 161 and 162 but not gate 160. The output signals appearing upon the output terminals of the gates 161 and 162 are negative and are returned to the "reset" input terminals of the respective bistable devices 144 and 145, thereby triggering these devices to their "reset" stable state. As the clock pulse is not passed through the gate 160, the bistable device 143 remains in its "set" condition, and the positive polarity pulse appearing at its output terminal *a* is directed through line 163 to one of the input terminals of each of gates 164, 165, and 166.

As the movable contact 21 continues to revolve counterclockwise and establishes contact with the stationary contact 23 at the beginning of the second scan period, the potential drop across the resistive path upon the photoconductive sensing surface 7 between the contact pairs 11–11′ appears as a positive polarity potential at the point 38. This potential is directed, through the line 39, to the common input terminal of the potential-level-sensitive circuit 27, which corresponds to scan position 2 and contact pairs 11–11′. Referring to FIGURE 2, it may be noted that in scan position 2, with the numerical digit "2" imaged upon the photoconductive surface, the potential drop across the contact pairs 11–11′ is positive four volts. This four-volt positive potential forward biases the diodes associated with the resistors 40 and 41 of the potential-level-sensitive sub-circuits of the potential-level-sensitive circuit 27, as it is of a magnitude greater than the reverse bias of respective magnitudes of four volts and three volts applied thereto. Upon the appearance of the clock pulse during scan period 2 upon the line 175 from the stationary contact 94 of the switch 91, through the action of the synchronizing circuitry in a manner previously described, this pulse is conducted through these diodes and appears as a positive potential pulse across respective resistors 40 and 41. This positive potential pulse is amplified by associated amplifiers 176 and 177 and the polarity thereof reversed in a manner previously described. The now negative polarity signal is directed to the "set" input terminals of respective bistable devices 179 and 180, thereby triggering these devices to their "set" condition of operation. In this condition, the signal upon the output terminals *a* thereof is of a positive polarity and is applied to one input terminal of each of gates 167 and 168. However, since the other input circuit terminals of these gates do not have positive polarity signals applied thereto, these gates are ineffective to pass any positive polarity clock pulses which may appear on clock line C.

As with the movable contact 21 of the sense scanning device 20 revolves to scan position 3 and establishes a contact with the stationary contact 24 at the beginning of the third scan period, the potential drop appearing across the corresponding contact pairs 12–12′ appears as a positive potential signal at the point 42. This signal is directed through the line 43 to the common input terminal of the associated potential-level-sensitive circuit 28. Referring to FIGURE 2, it may be noted that, in the third scan position, with the numerical digit "2" imaged upon the photoconductive surface 7, the potential drop across the contact pairs 12–12′ is a positive two volts. Since the diode associated with the resistor 47 of the potential-level-sensitive sub-circuit of the potential-level-sensitive circuit 28 is reverse biased by a constant positive potential bias of one volt, this is the only diode of this potential-level-sensitive circuit which is forward biased. Upon the appearance of the clock pulse during this scan period upon the input circuit terminal of the potential-level-sensitive circuit 28 through the movable contact 92 and the stationary contact 95 of the switch 91, through the action of the synchronizing circuitry in a manner previously described, this pulse is conducted through this diode and appears as a positive potential signal across the resistor 47. This positive potential signal is amplified and the polarity reversed in the amplifier 181 and applied as a negative potential signal upon the "set" input terminal of a bistable device 182. It may be noted that bistable devices 183, 184, and 185, also associated with scan position 3, are unaffected with the numerical digit "2" imaged upon the photoconductive surface 7 of the sensing device. With the bistable device 182 in its "set" condition, the positive polarity signal appearing at its output terminal *a* is applied to one of the input circuit terminals of a gate 172. However, since none of the other input terminals of this gate have positive polarity signals thereon, it is ineffective to pass clock pulses which appear on the clock line C.

As the movable contact 21 of the sense scanning device 20 establishes contact with the stationary contact 24 of scan position 3 at the beginning of the fourth scan period, the potential drop appearing across the corresponding contact pairs 13–13′ appears as a positive potential signal at the point 50. This signal is directed through the line 51 to the common input terminal of the associated potential-level-sensitive circuit 29. Referring to FIGURE 2, it may be noted that in scan position 4, with the numerical digit "2" imaged upon the photoconductive sensing surface 7, the potential drop across the contact pairs 13–13′ is a positive two volts. As the only diode, of the potential-level-sensitive sub-circuits of the potential-level-sensitive circuit 29, which is reverse biased by a positive potential equal to two volts is that associated with the resistor 57, this is the only diode which is forward biased. As the next clock pulse is passed during this fourth scan period by the operation of the synchronizing circuit initiating circuit, the synchronizing circuit and by switch 91 and is applied to the input terminal of the potential-level-sensitive circuit 29, it appears as a positive potential pulse across the resistor 57. This positive potential pulse is amplified and polarity reversed by an amplifier 188, in a manner previously described, and is applied as a "set" pulse to the "set" input terminal of a bistable device 190. It may be noted that the bistable devices 191 and 192, also associated with scan position 4, are unaffected with the decimal digit "2" imaged upon the scanning surface. With the bistable device 190 in its "set" condition of operation, the positive potential signal appearing at its output terminal *a* is applied to one of the input terminals of a gate 166.

It may be noted that the gate 166 has four input terminals exclusive of the clock input terminal. Since the bistable devices 191 and 192 are in their "reset" state, the potential at their output terminals *b* are of a positive polarity, and this potential is applied to respective ones of the input terminals of the gate 166, as shown. The positive polarity potential appearing at the *a* output terminal of the bistable device 190 in the "set" condition is applied to a third input terminal of the gate 166, and the positive polarity potential appearing at the *a* output terminal of the bistable device 143, still in its "set" condition since the first scan period, is applied to the fourth input terminal of the gate 166. With a positive polarity signal applied to each of the four input terminals of this gate exclusive of the clock terminal, this gate is enabled to pass the next positive polarity clock pulse which appears on clock line C, and this output signal pulse appears on the output terminal 102, which corresponds to the decimal digit "2," as previously described.

As none of the other gates 164, 165, 167, 168, 169, 170, 171, or 172 have positive polarity signals applied to all of the input terminals, exclusive of the clock terminal, they are all ineffective to pass the clock signal at this time; hence no signal appears on any of the other output circuit terminals. Therefore, the evaluating logic circuitry of this invention has produced an output signal upon an output circuit terminal which corresponds to the character imaged upon the sensing surface 7 of the sensing device.

By tracing other numerical digits through this circuitry, it may be found that with any one of the numerical digits imaged upon the photoconductive sensing surface 7, the logic evaluating circuitry of this system will produce an output signal upon the output circuit terminal corresponding to that digit.

During the course of this specification, certain polarities and conditions of operation have been assumed for purposes of illustration. It is to be understood that other polarities and other states or conditions of operation may be used without departing from the spirit of this invention. It is also to be specifically understood that the term "photosensitive" includes materials having photoconductive, photosensitive, and photovoltaic electrical characteristics.

While a preferred embodiment of this invention has been shown and described, it will be obvious to those skilled in the art that various modifications and substitutions may be made without departing from the spirit of the invention, which is to be limited only within the scope of the appended claims.

What is claimed is:

1. A character identification system comprising a source of direct current potential, a sensing device having a photosensitive surface area, means for imaging the character to be identified upon said photosensitive surface area, means for successively applying said source of direct current potential across each of a plurality of paths upon said photosensitive surface area as determined by a plurality of pairs of spaced points thereon whereby potential drops dependent on the imaged character are successively developed across each of said paths, potential-level-sensitive circuit means for producing signal pulses to be evaluated in response to the said potential drop across each of said paths, and evaluating logic circuit means for producing an output signal representative of the character imaged upon the said photosensitive sensing surface area in response to said signal pulses produced by said potential-level-sensitive circuit means.

2. A device as in claim 1 wherein an output circuit means corresponding to each character to be identified is coupled to the logic circuit means, said output circuit means being constructed to produce an output signal corresponding to the imaged character in response to the signal pulses produced by said potential-level-sensitive circuit means.

3. A character identification system comprising a source of direct current potential, a sensing device having a photosensitive sensing surface area and a plurality of electrical contact pairs selectively positioned upon and in electrical contact with said surface area, means for imaging the character to be identified upon said photosensitive surface area, means for successively applying said source of direct current potential across each of said electrical contact pairs upon said photosensitive surface area whereby a potential drop is successively developed across each pair of electrical contact pairs, potential-level-sensitive circuit means for producing signal pulses to be evaluated in response to said potential drop across each of said electrical contact pairs, and evaluating logic circuit means for producing an output signal representative of the character imaged upon the said photosensitive sensing surface area in response to said signal pulses produced by said potential-level-sensitive circuit means.

4. A device as in claim 3 wherein an output circuit means corresponding to each character to be identified is coupled to the logic circuit means, said output circuit means being constructed to produce an output signal corresponding to the imaged character in response to the signal pulses produced by said potential-level-sensitive circuit means.

5. A character identification system comprising a source of direct current potential, a source of electrical clock pulses, a photosensitive surface, a plurality of electrical contact pairs selectively positioned to define a sensing area upon and electrically connected to said photosensitive surface, means for imaging the character to be identified upon said photosensitive surface within said sensing area, sense scanning means for successively applying said source of direct current potential across each of said electrical contact pairs during successive scan periods whereby the direct current potential is developed across each of said contact pairs during each scan period, a potential-level-sensitive circuit means corresponding to each of said electrical contact pairs for producing signal pulses to be evaluated, electrical circuit means for directing the potential developed across each of said electrical contact pairs to the corresponding said potential-level-sensitive circuit means during each of said scan periods, electrical circuit means for directing one electrical clock pulse during each scan period to the said potential-level-sensitive circuit means corresponding to the said electrical contact pair being scanned during that scan period whereby signal pulses to be evaluated are produced thereby during each scan period, and evaluating logic circuit means for producing an output signal representative of the character imaged upon said photosensitive surface in response to the said signal pulses produced by said potential-level-sensitive circuit means during all said scan periods.

6. A character identification system comprising a source of direct current potential, a source of electrical clock pulses, a photosensitive surface, a plurality of electrical contact pairs selectively positioned to define the boundary of a sensing area, all of the contacts of said contact pairs being electrically connected to said photosensitive surface, means for imaging the character to be identified upon said photosensitive surface within said sensing area, sense scanning means for successively applying said source of direct current potential across each of said electrical contact pairs during successive scan periods whereby the direct current potential is developed across each of said contact pairs during each scan period, a potential-level-sensitive circuit means, including a plurality of potential-level-sensitive sub-circuit means each of which is sensitive to a different potential level, corresponding to each of said electrical contact pairs for producing signal pulses to be evaluated, electrical circuit means for directing the potential developed across each of said electrical contact pairs to the corresponding said potential-level-sensitive circuit means during each of said scan periods whereby those of said included potential-level-sensitive sub-circuit means which are sensitive to a potential level of a magnitude lower than that applied thereto are enabled to conduct an electrical pulse therethrough, electrical circuit means for directing one electrical clock pulse during each scan period to the said potential-level-sensitive circuit means corresponding to the said electrical contact pair being scanned during that scan period whereby a signal pulse to be evaluated is produced by each of said enabled potential-level-sensitive sub-circuit means in response to the conduction therethrough of said clock pulse, and evaluating logic circuit means for producing an output signal representative of the character imaged upon said photosensitive surface in response to the said signal pulses produced by said enabled potential-level-sensitive sub-circuit means during all said scan periods.

7. The character identification system defined in claim 6 wherein the said photosensitive surface is of a material characterized by a decrease in electrical resistivity when illuminated.

8. The character identification system defined in claim 6 wherein the said photosensitive surface is of a material characterized by an increase in electrical resistivity when illuminated.

References Cited by the Examiner

UNITED STATES PATENTS 3,181,120 4/1965 Lieberman -------- 340—146.3

MAYNARD R. WILBUR, *Primary Examiner*.

J. E. SMITH, *Assistant Examiner*.